(12) United States Patent
Brewington et al.

(10) Patent No.: US 9,396,577 B2
(45) Date of Patent: Jul. 19, 2016

(54) USING EMBEDDED CAMERA PARAMETERS TO DETERMINE A POSITION FOR A THREE-DIMENSIONAL MODEL

(75) Inventors: Brian Brewington, Fort Collins, CO (US); David Hawkey, Boulder, CO (US); Bryce Stout, Seattle, WA (US)

(73) Assignee: Google Inc., Mountain View, CA (US)

( * ) Notice: Subject to any disclaimer, the term of this patent is extended or adjusted under 35 U.S.C. 154(b) by 617 days.

(21) Appl. No.: 13/397,941

(22) Filed: Feb. 16, 2012

(65) Prior Publication Data
US 2015/0228112 A1  Aug. 13, 2015

(51) Int. Cl.
| | | |
|---|---|---|
| G06T 15/04 | (2011.01) | |
| G06T 7/60 | (2006.01) | |
| G06T 17/05 | (2011.01) | |
| G06T 7/00 | (2006.01) | |
| G06T 17/00 | (2006.01) | |
| G01C 11/30 | (2006.01) | |
| G01C 11/00 | (2006.01) | |

(52) U.S. Cl.
CPC .............. *G06T 15/04* (2013.01); *G01C 11/00* (2013.01); *G01C 11/30* (2013.01); *G06T 7/004* (2013.01); *G06T 7/0022* (2013.01); *G06T 7/0032* (2013.01); *G06T 7/0042* (2013.01); *G06T 7/0065* (2013.01); *G06T 7/0075* (2013.01); *G06T 7/606* (2013.01); *G06T 17/00* (2013.01); *G06T 17/05* (2013.01)

(58) Field of Classification Search
None
See application file for complete search history.

(56) References Cited

U.S. PATENT DOCUMENTS

| | | | | |
|---|---|---|---|---|
| 5,339,394 | A * | 8/1994 | Johnson, Jr. .......... | G06F 9/3824 345/502 |
| 5,699,800 | A * | 12/1997 | Heywang-Koebrunner .......... | G01R 33/28 324/318 |
| 7,990,394 | B2 | 8/2011 | Vincent et al. | |
| 8,072,448 | B2 | 12/2011 | Zhu et al. | |
| 8,239,220 | B2 | 8/2012 | Kidd et al. | |
| 8,244,462 | B1 * | 8/2012 | Zhu .......................... | G01C 5/00 701/408 |
| 8,339,394 | B1 * | 12/2012 | Lininger ................. | G06T 15/04 345/419 |
| 8,525,825 | B2 | 9/2013 | Zhu et al. | |
| 8,681,151 | B2 * | 3/2014 | Coombe ................. | G06T 19/00 345/423 |
| 8,699,800 | B1 * | 4/2014 | Chau ................. | G06F 17/30265 382/201 |
| 8,700,304 | B1 * | 4/2014 | Zhu .......................... | G01C 5/00 342/357.34 |

(Continued)

OTHER PUBLICATIONS

Yang, Yi, and Shawn Newsam. "Geographic image retrieval using local invariant features." Geoscience and Remote Sensing, IEEE Transactions on51.2 (Aug. 2012): 818-832.*

(Continued)

*Primary Examiner* — Kim Vu
*Assistant Examiner* — Nathan Bloom
(74) *Attorney, Agent, or Firm* — Dority & Manning, P.A.

(57) ABSTRACT

Embodiments relate to selecting textures for a user-supplied photographic image in image-based three-dimensional modeling. In a first embodiment, a computer-implemented method includes a method positioning a geographic structure using user-supplied photographic images of a geographic structure. In the method, a user-supplied photographic images inputted by a user are received. Embedded camera parameters that specify a position of the cameras when each user-supplied photographic image was taken and are embedded in each user-supplied photographic image are read. An estimated location of the geographic structure is automatically determined based on the embedded camera parameters in each user-supplied photographic image. Each user-supplied photographic image to be texture mapped to the three-dimensional model is enabled.

22 Claims, 6 Drawing Sheets

(56) References Cited

U.S. PATENT DOCUMENTS

| | | | |
|---|---|---|---|
| 8,818,132 B2 | 8/2014 | Zhang et al. | |
| 2001/0043738 A1* | 11/2001 | Sawhney | G01S 5/163 |
| | | | 382/154 |
| 2006/0239539 A1* | 10/2006 | Kochi | G01C 11/02 |
| | | | 382/154 |
| 2007/0110338 A1* | 5/2007 | Snavely | G06F 17/30274 |
| | | | 382/305 |
| 2009/0079730 A1* | 3/2009 | Lee | G06T 3/4038 |
| | | | 345/419 |
| 2009/0141966 A1* | 6/2009 | Chen | G06T 7/0028 |
| | | | 382/154 |
| 2009/0228204 A1* | 9/2009 | Zavoli | G01C 21/30 |
| | | | 701/532 |
| 2010/0214284 A1* | 8/2010 | Rieffel | G06T 17/00 |
| | | | 345/419 |
| 2010/0244344 A1* | 9/2010 | Mougin | B25J 15/0052 |
| | | | 269/21 |
| 2011/0096083 A1* | 4/2011 | Schultz | G06T 15/04 |
| | | | 345/583 |
| 2011/0110557 A1* | 5/2011 | Clark | G01C 11/06 |
| | | | 382/103 |
| 2012/0113138 A1* | 5/2012 | Uusitalo | G06Q 10/047 |
| | | | 345/629 |
| 2012/0127169 A1* | 5/2012 | Barcay | G06T 15/20 |
| | | | 345/419 |
| 2012/0265698 A1 | 10/2012 | Kidd et al. | |
| 2013/0002648 A1* | 1/2013 | Bacus | G06F 17/248 |
| | | | 345/419 |
| 2013/0069944 A1* | 3/2013 | Altman | G06T 17/05 |
| | | | 345/420 |
| 2013/0086517 A1* | 4/2013 | Van Lancker | G06F 3/04815 |
| | | | 715/800 |
| 2013/0176384 A1* | 7/2013 | Jones | H04N 5/23238 |
| | | | 348/36 |
| 2013/0243250 A1* | 9/2013 | France | G01C 15/00 |
| | | | 382/103 |
| 2013/0300740 A1 | 11/2013 | Snyder et al. | |
| 2013/0325328 A1* | 12/2013 | Anguelov | G01C 21/32 |
| | | | 701/445 |

OTHER PUBLICATIONS

G. Verhoeven, M. Doneus, Ch. Briese, F. Vermeulen, Mapping by matching: a computer vision-based approach to fast and accurate georeferencing of archaeological aerial photographs, Journal of Archaeological Science, vol. 39, Issue 7, Jul. 2012, pp. 2060-2070.*

Gael Sourimant et al. Toward automatic GIS-video initial registration. Published online Mar. 30, 2011 (14 pages).

Jiann-Yeou Rau, et al. Integration of GPS, GIS and photogrammetry for texture mapping in photo-realistic city modeling. Published 2006 (10 pages).

* cited by examiner

USING EMBEDDED CAMERA PARAMETERS TO DETERMINE A POSITION FOR A THREE-DIMENSIONAL MODEL

BACKGROUND

1. Field of the Invention

This field is generally related to photogrammetry.

2. Related Art

Three-dimensional modeling tools, such as computer-aided design (CAD) tools enable users to define three-dimensional models, such as a three-dimensional model of a building. Photographic images of the building may be available from, for example, satellite, aerial, vehicle-mounted streetview and user cameras. The photographic images of the building may be texture mapped to the three-dimensional model to create a more realistic rendering of the building.

BRIEF SUMMARY

Embodiments relate to inputting user-supplied photographic images for use in image-based three-dimensional modeling. In a first embodiment, a computer-implemented method provides positioning for a geographic structure using user-supplied photographic images of the geographic structure. User-supplied photographic images inputted by a user are received where each user-supplied photographic image captures a different point-of-view of the geographic structure. Embedded camera parameters are read from each user-supplied photographic image where the embedded camera parameters specify a position of each camera when each user-supplied photographic image was taken. An estimated location of the geographic structure is automatically determined based on the embedded camera parameters.

Further embodiments, features, and advantages of the invention, as well as the structure and operation of the various embodiments of the invention are described in detail below with reference to accompanying drawings.

BRIEF DESCRIPTION OF THE FIGURES

The accompanying drawings, which are incorporated herein and form a part of the specification, illustrate the present invention and, together with the description, further serve to explain the principles of the invention and to enable a person skilled in the pertinent art to make and use the invention.

The drawing in which an element first appears is typically indicated by the leftmost digit or digits in the corresponding reference number. In the drawings, like reference numbers may indicate identical or functionally similar elements.

DETAILED DESCRIPTION OF EMBODIMENTS

Embodiments relate to creating three-dimensional models from two-dimensional images, including a user supplied photographic image. A photogrammetry algorithm is used to derive the three-dimensional model from selections on the two-dimensional images. These and other embodiments are described below with reference to the accompanying drawings.

In the detailed description of embodiments that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Photogrammetry with User Supplied Photos

Embodiments include methods and systems for positioning a geographic structure using user-supplied photographic images. For conciseness and convenience, this document refers to positioning buildings. However, it should be understood that the term structure, as used herein, includes other natural and man-made structures, such as buildings, communication towers, trees, mountains, glaciers, canyons and the like, that may be positioned using user-supplied photographic images.

Figure 1A:
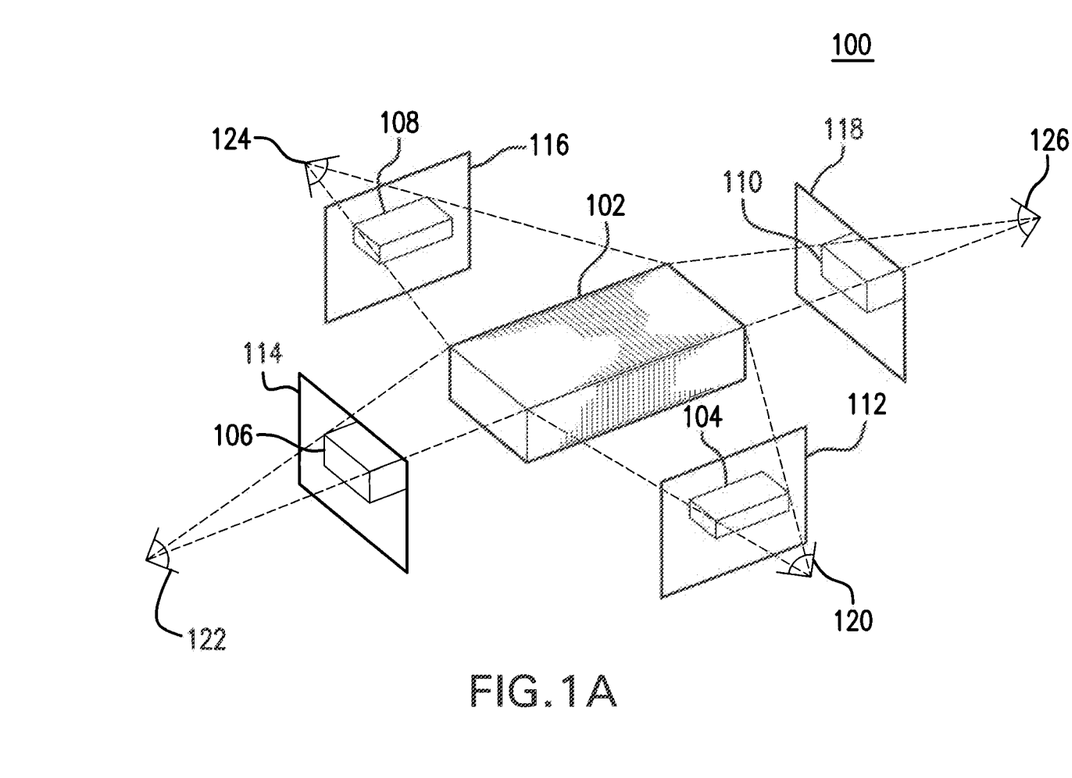
FIG. 1A is a diagram illustrating a geographic structure point-of-view capturing configuration, according to an embodiment.

FIG. 1A is a diagram illustrating a geographic structure point-of-view capturing configuration 100. Geographic structure point-of-view capturing configuration 100 includes a plurality of user-supplied photographic images 112, 114, 116, and 118 that each capture building 102 from a different perspective. User-supplied photographic image 112 captures perspective 104 of building 102. User-supplied photographic image 114 captures perspective 106 of building 102. User-supplied photographic image 116 captures perspective 108 of building 102. User-supplied photographic image 118 captures perspective 110 of building 102. Each user-supplied photographic image 112 through 118 captures each perspective of building 102 from a respective camera. Camera 120 captures user-supplied photographic image 112. Camera 122 captures user-supplied photographic image 114. Camera 124 captures user-supplied photographic image 116. Camera 126 captures user-supplied photographic image 118.

Each of user-supplied photographic images 112 through 118 may be an aerial or satellite image and may have an oblique or nadir perspective. Further, one or more of user-supplied photographic images 112 through 118 may be a photographic image captured from street level, such as a portion of a panoramic image captured from a vehicle in motion.

A user may, for example, input each user-supplied photographic image 112 through 118 into a user interface. The user may select a photo, either local to the user's client or on a remote server. In an example, the user may upload any number of user-supplied photographic images 112 through 118. Plurality of user photographic images 112 through 118 may include, but are not limited to, photographs taken and/or uploaded by the user. Plurality of user photographic images 112 through 118 may also include but are not limited to photographs taken by other individuals. For example, the photographs may be retrieved from image sharing websites where other users can upload the photograph to the image sharing sites.

In an embodiment, each plurality of user-supplied photographic images 112 through 118 captures each point-of-view of building 102. The user may input plurality of user-supplied photographic images 112 through 118 so that each user-supplied photographic image 112 through 118 captures a different point-of-view of building 102. The user may input a quantity of user-supplied photographic image 112 through 118 so that when combined plurality of user-supplied photographic images 112 may be sufficient to capture adequately each point-of-view of building 102.

For example, the user may input each of user-supplied photographic images 112 through 118 to adequately capture each point-of-view of building 102. The user may input user-supplied photographic image 112 that captures perspective 104 of a front broadside portion of building 102. The user may input user-supplied photographic image 114 that captures perspective 106 of a front portion of building 102. The user may input user-supplied photographic image 114 that captures perspective 108 of a rear broadside portion of building 102. The user may input user-supplied photographic image 118 that captures perspective 110 of a rear portion of building 102. Each user-supplied photographic image 112 through 118 when combined may be sufficient to adequately capture each point-of-view of building 102. As would be appreciated by one having skill in the relevant art given the description herein, any quantity of user-supplied photographic images 112 through 118 can be used to similar effect and without changing the applicability of this invention as long as each point-of-view of building 102 is captured.

For user-supplied photos to be used in three-dimensional modeling using photogrammetry, their associated camera parameters must be determined. In an embodiment, the camera parameters may include a position, orientation (e.g., pan, tilt, and roll), angle, focal length, prism point, and a distortion factor of each of cameras 120 through 126. As is discussed below, as the user constrains the photo to a three-dimensional geometry, the camera parameters may become more accurate. However, before photogrammetry may be used to increase the accuracy of the parameters, initial values must first be determined.

In an example, at least some of the initial camera parameters may be stored in a header of the photograph, for example, in an EXIF header of a JPEG image. For some JPEG images, the EXIF header may include the position of the camera, the camera's orientation and a focal length of a camera. In many cases, images may not have camera parameter data as header information.

In cases where accurate camera parameters are not available in an image's header, at least some of the camera parameters may be determined by geographic data provided by cameras 120 through 126 that captured each of user-supplied photographic images 112 through 118. Each camera 120 through 126 may provide embedded camera parameters for each user-supplied photographic image 112 through 118 captured by cameras 120 through 126. The embedded camera parameters provided by each camera 120 through 126 include camera parameters related to the position of each camera 120 through 126 when each of user-supplied photographic images 112 through 118 was taken. For example, each camera 120 through 126 may embed the latitudinal data and longitudinal data in each user-supplied photographic image 112 through 118 captured by cameras 120 through 126. The latitudinal data and longitudinal data embedded in each user-supplied photographic image 112 through 118 specifies the latitudinal and longitudinal position of each camera 120 through 126 when each of user-supplied photographic images 112 through 118 was taken.

In an example, camera 120 may embed a latitude and longitude in an EXIF header of user-supplied photographic image 112 that corresponds to the location of camera 120 that captured front broadside portion 104 of building 102. Camera 122 may embed a latitude and longitude in an EXIF header of user-supplied photographic image 114 that corresponds to the location of camera 122 that captured front portion 106 of building 102. Camera 124 may embed a latitude and longitude in an EXIF header of user-supplied photographic image 124 that corresponds to the location of camera 124 that captured rear broadside portion of building 102. Camera 126 may embed a latitude and longitude in an EXIF header of user-supplied photographic image 118 that corresponds to the location of camera 126 that captured rear portion of building 102. In another example, cameras 120 through 126 may provide embedded camera parameters for user-supplied photographic image 112 through 118 in the metadata of each user-supplied photographic image 112 through 118. In addition to latitude and longitude, the camera may also embed a heading angle in the EXIF header of user-supplied photographic image 112 that corresponds to a pan angle of the picture.

In an embodiment, the estimated location of building 102 may be automatically determined based on the embedded camera parameters of each user-supplied photographic image 112 through 118. The estimated location of building 102 may be determined based on each point-of-view of building 102 captured by each user-supplied photographic image 112 through 118. Each user-supplied photographic image 112 through 118 contains embedded camera parameters related to the location of each camera 120 through 126 that each captured a different point-of-view of building 102. The combination of the embedded camera parameters representing the location of a different point-of-view of building 102 may provide sufficient data to automatically determine an estimated location of building 102.

Figure 1B:
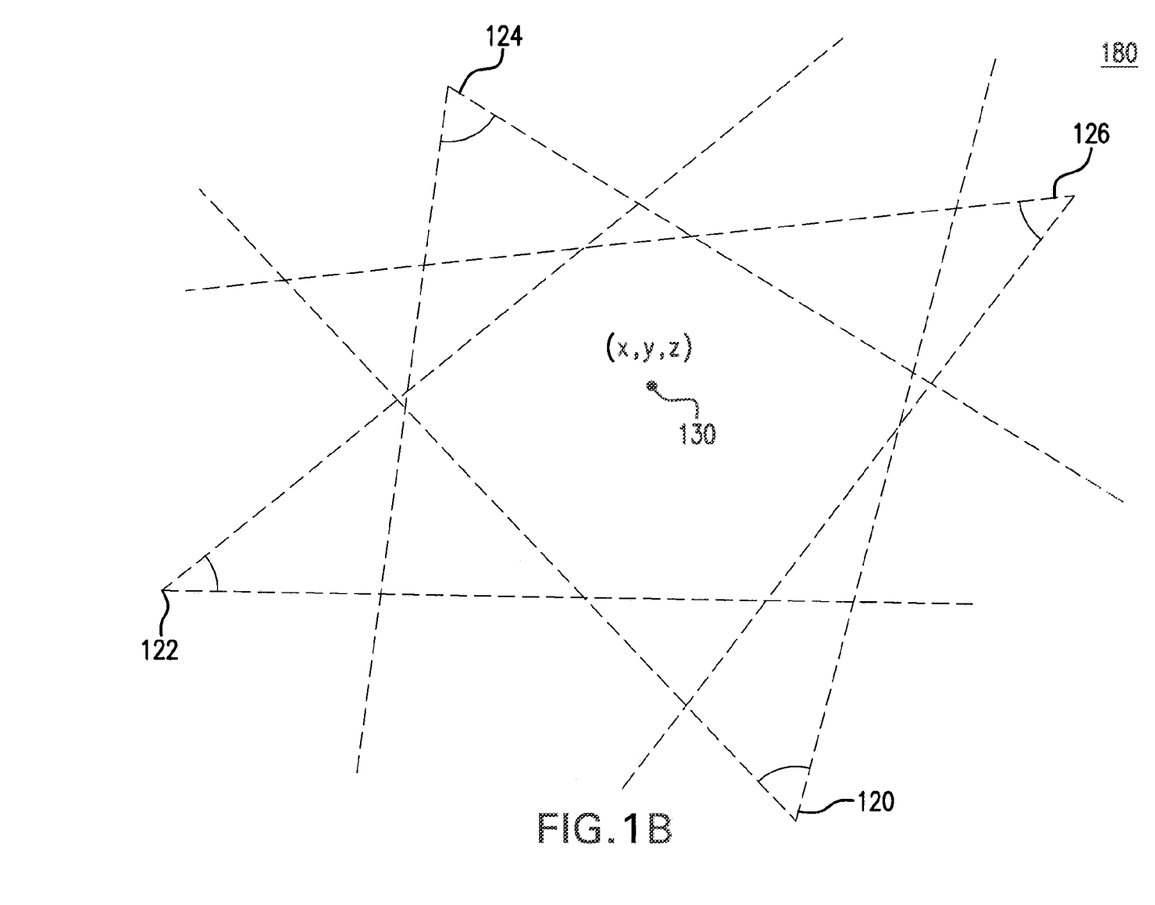
FIG. 1B is a diagram illustrating a centroid calculated from the embedded camera parameters of each user-supplied photographic image where the centroid is an estimated centroid of a building, according to an embodiment.

In an embodiment, the estimated location of building 102 may be automatically determined based on the centroid calculated from the embedded camera parameters of each user-supplied photographic image 112 through 118. FIG. 1B exhibits a centroid calculating configuration 180 where centroid 130 may be calculated from the embedded camera parameters of each user-supplied photographic image 112 through 118 where centroid 130 is an estimated centroid of building 102. Centroid 130 may be the centroid of each location of cameras 120 through 126 that each captured a different point-of-view of building 102. The embedded camera parameters corresponding to each point-of-view of building 102 captured by cameras 120 through 126 provides sufficient data to accurately estimate the centroid of building 102 by calculating centroid 130. The centroid of building 102 corresponds to an estimated location of building 102.

For example, the embedded camera parameters of each user-supplied photographic image 112 through 118 may specify the location of the position of each camera 120 through 126 when each user-supplied photographic image 112 through 118 was taken. For example, the embedded camera parameters of user-supplied photographic image 112 through 118 may specify the latitudinal and longitudinal position of each camera 120 through 126 when each of user-supplied photographic images 112 through 118 was taken. Centroid 130 may be calculated based on the latitudinal and longitudinal position of each camera 120 through 126 as shown in FIG. 1B. Because each point-of-view of building 102 was captured, centroid 130 may accurately represent the centroid of building 102 which may accurately represent the location of building 102.

Once centroid 130 has been calculated, the user may have the option to provide feedback and refine the calculated location of building 102. For example, the user may recognize that the location of building 102 based on centroid 130 may be off in the latitudinal direction. The user may refine the calculated location of building 102 by correcting the location of building 102 in the latitudinal direction.

As noted above, initial camera parameters for each user-supplied photographic image 112 through 118 must first be determined before three-dimensional modeling using photogrammetry may be implemented. To automatically determine the initial camera parameters rather than requiring the user to provide them, the estimated location of building 102 determined from centroid 130 may be used. For example, a two-dimensional position corresponding to the location of each camera 120 through 126 that captured each user-supplied photographic image 112 through 118 may be required for three-dimensional modeling of building 102 using photogrammetry to be implemented. As mentioned above, latitude, longitude, and pan angle may be available in the embedded camera parameters. Tilt camera angles may also be available if, for example, the camera had an accelerometer that detects the direction of gravity.

To the extent that those parameters are not available from other sources (e.g., in an EXIF header), default values may be assigned to those values. For example, it may not provide an altitude for each camera 120 through 126. In that example, the altitude may be set to a default value. The default value may be a fixed offset from the altitude at the latitude and longitude. The fixed offset may correspond to a typical height of a camera when taking a picture.

Similarly, it may not provide a roll or tilt angle specifying the camera's orientation in three-dimensional space. In that example, the tilt and roll may be set by default to be zero (i.e. level and parallel with the ground). Other camera parameters (e.g., focal length) may be set by default to typical values for consumer cameras. In this way, using map positioning, EXIF headers, and default values, an initial set of camera parameters may be determined.

Once the initial camera parameters for the user-supplied photo is specified, a user may constrain particular positions on the user-supplied photo to positions on a previously-defined three-dimensional model. Using the constraints, a photogrammetry algorithm may be used to further refine the camera parameters, the geometry of the three-dimensional model or both. Application of user constraints and a photogrammetry algorithm is described with respect to FIGS. 2-6.

Figure 2:
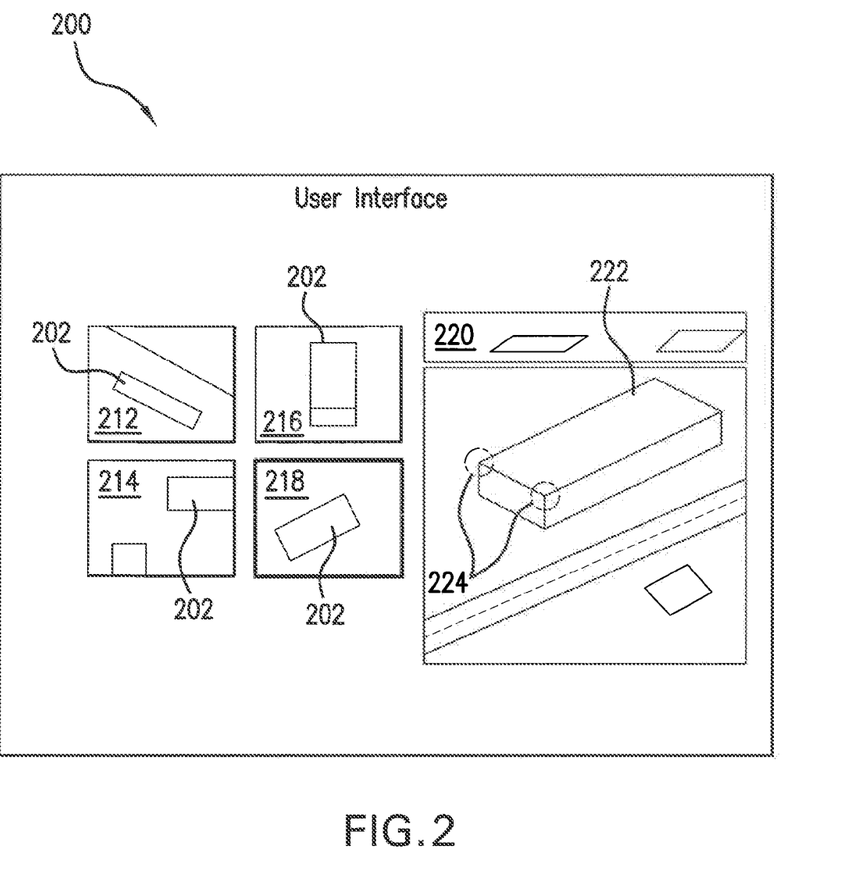
FIG. 2 is a diagram showing a user interface for creating a three-dimensional model from two-dimensional images, according to an embodiment.

FIG. 2 shows a diagram showing a user interface 200 for creating a three-dimensional model from two-dimensional images. As described below with respect to FIG. 8, user interface 200 may, in an embodiment, be a web based user interface. In the embodiment, a server may serve to a client data, such as Hypertext markup language (HTML) data, Javascript, or animation (e.g. FLASH) data, specifying user interface 200. Using that data, the client may render and display user interface 200 to a user.

User interface 200 includes images 212, 214, 216, and 218 of a building 202. Each of images 212, 214, 216, and 218 is a photographic image capturing building 202 from a different perspective. Each of images 212, 214, 216, and 218 may be an aerial or satellite image and may have an oblique or nadir perspectives. Further, one or more of images 212, 214, 216, and 218 may be a photographic image captured from street level, such as a portion of a panoramic image captured from a vehicle in motion. Each of images 212, 214, 216, and 218 may be displayed with an indication (such as a colored outline) indicating whether a user constraint has been received for the image.

Figure 3:
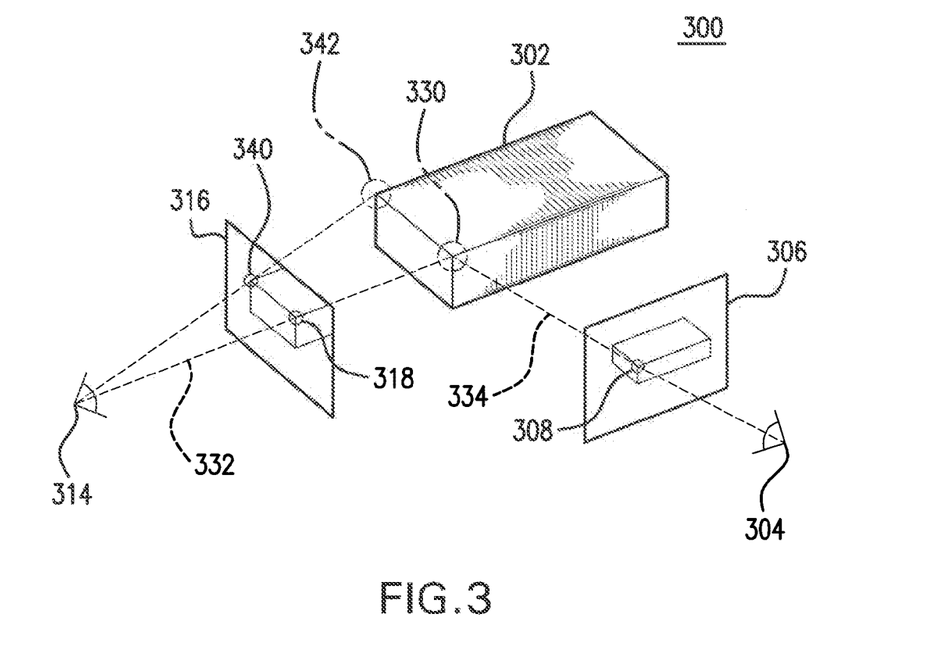
FIG. 3 is a diagram illustrating creating a three-dimensional model from user selections in two-dimensional images, according to an embodiment.

In an example, a user may select one of images 212, 214, 216, and 218 to display in a viewport 220. In viewport 220, a three-dimensional model 222 may also be displayed. Three-dimensional model 222 may be displayed, for example, as a wireframe structure so as to avoid obscuring the photographic image in viewport 220. By selecting points, such as points 224, on three-dimensional model 222, a user may constrain three-dimensional model 222 to the image in viewport 220. More specifically, a user may indicate that a position on the three-dimensional model corresponds to a position on the photographic image in viewport 220. By inputting constraints for the plurality of images 212, 214, 216, and 218, a user can specify where three-dimensional model 222 appears in each of the images. Based on the user specifications, the geometry of three-dimensional model 222 may be determined using a photogrammetry algorithm as illustrated in FIG. 3. In this way, a user may define three-dimensional model 222 to model building 202 using images of the building.

FIG. 3 shows a diagram 300 illustrating creating a three-dimensional model from user selections in two-dimensional images. Diagram 300 shows a three-dimensional model 302 and multiple photographic images 316 and 306 of a building. Images 316 and 306 were captured from cameras having different perspectives, as illustrated by camera 314 and 304. As mentioned above, a user may input constraints on images 316 and 306, such as constraints 318 and 308, and those constraints may be used to determine the geometry of three-dimensional model 302. The geometry of three-dimensional model 302 may be specified by a set of geometric parameters, representing, for example, a position of an origin point (e.g., x, y, and z coordinates), a scale (e.g., height and width), an orientation (e.g., pan, tilt, and roll). Depending on a shape of three-dimensional model 302 (e.g., box, gable, hip, pyramid, top-flat pyramid, or ramp) additional geometric parameters may be needed. For example, to specify the geometry of a gable, the angle of the gable's slopes or a position of the gable's tip may be included in the geometric parameters.

To determine the geometry of three-dimensional model 302, the user constraints from the images may be used to determine rays in three-dimensional space and the rays are used to determine the geometry. In diagram 300, a ray 332 may be determined based on user constraint 318, and a ray 334 may be determined based on a user constraint 308. Rays 332 and 334 are constructed based on parameters associated with cameras 314 and 304 respectively. For example, ray 332 may be extended from a focal point or entrance pupil of camera 314 through a point corresponding to user constraint 318 at a focal length distance from the focal point of camera 314. Similarly, ray 334 may be extended from a focal point or entrance pupil of camera 304 through a point corresponding to user constraint 308 at a focal length distance from the focal point of camera 304. Using rays 332 and 334, a position 330 on three-dimensional model 302 may be determined. This process is known as photogrammetry. In this way, the geometry of three-dimensional model 302 may be determined based on user constraints 318 and 308, and parameters representing cameras 314 and 304.

However, the parameters representing cameras 314 and 304 may not be accurate. As mentioned above, the camera parameters may include a position, orientation (e.g., pan, tilt, and roll), angle, focal length, prism point, and a distortion factor of each of cameras 314 and 304. In an example, photographic images 316 and 306 may have been taken from satellites, vehicles, or airplanes, and the camera position and orientation may not be completely accurate. Alternatively, one or both of photographic images 316 and 306 may have been taken by a user with only a general idea of where her camera was positioned when it took the photo.

In cases where the camera parameters are inaccurate, a photogrammetry algorithm may need to solve both the camera parameters representing the cameras that took the photographic images and geometric parameters representing the three-dimensional model. This may represent a large and complex non-linear optimization problem.

Figure 4:
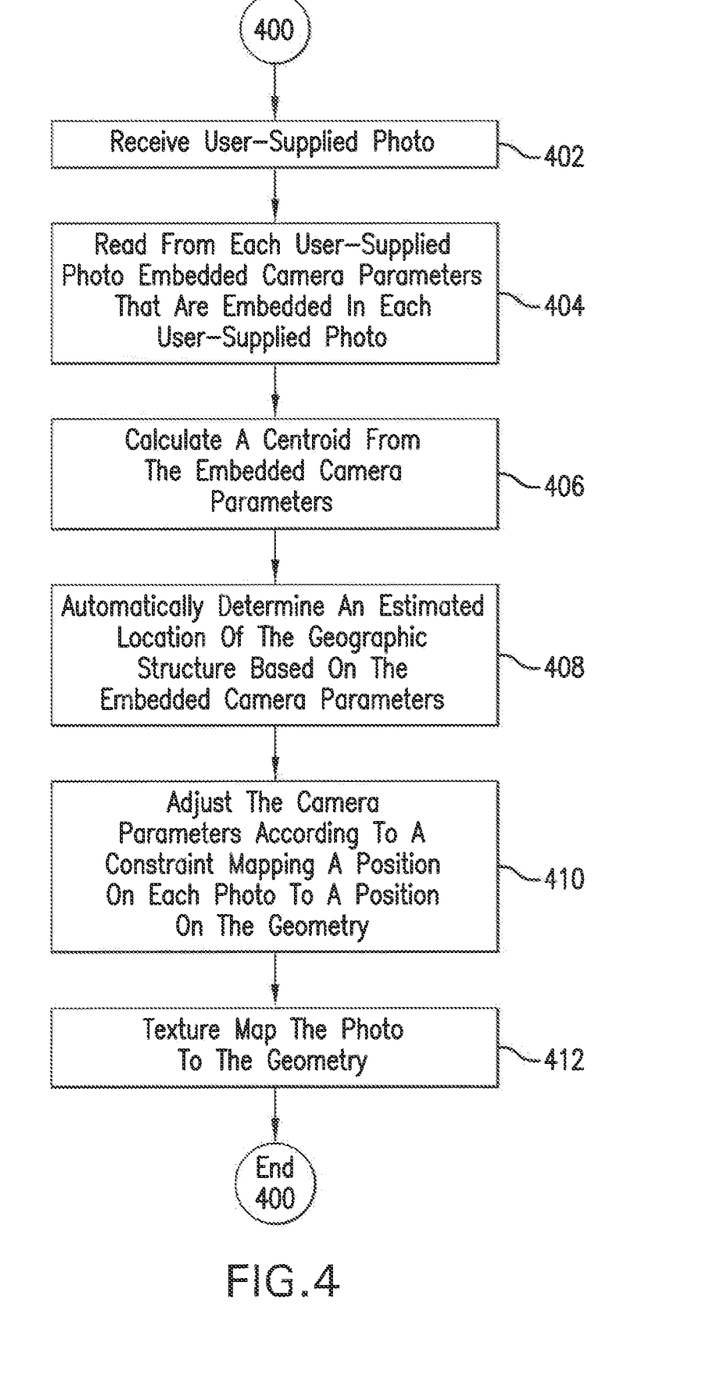
FIG. 4 is a flowchart showing a method for selecting a texture for a face of a three-dimensional model based on photographic images input by a user that includes embedded camera parameters for the photographic image inputs, according to an embodiment.

FIG. 4 is a flowchart showing a method 400 for selecting a texture for a face of a three-dimensional model based on photographic images input by a user that includes embedded camera parameters for the photographic image inputs.

Method 400 begins at step 402 with receiving the user-supplied photographic images input by a user. For example, as shown in FIG. 1A, the user may add user-supplied photographic images 112 through 118 where each user-supplied photographic image 112 through 118 captures a different point-of-view of building 102.

At step 404, embedded camera parameters that are embedded in each user-supplied photographic image are read from each user-supplied photographic image. The embedded camera parameters for each user-supplied photographic image correspond to a position of the camera from which each user-supplied photographic image was taken. For example, as shown in FIG. 1A, the embedded camera parameters embedded in each user-supplied photographic image 112 through 118 correspond to a position of each camera 120 through 126 from which each user-supplied photographic image 112 through 118 was taken.

At step 406, a centroid is calculated from the embedded camera parameters. For example, as shown in FIG. 1A and FIG. 1B, centroid 130 may be calculated from the embedded camera parameters of each user-supplied photographic image 112 through. 118 where centroid 130 may represent an estimated centroid of building 102.

At step 408, an estimated location of the geographic structure is automatically determined based on the embedded camera parameters in each user-supplied photographic image. For example, as shown in FIG. 1A and FIG. 1B, the estimated location of building 102 is automatically determined based on centroid 130 calculated from the embedded camera parameters of each user-supplied photographic image 112 through 118.

At step 410, the camera parameters may be adjusted according to a constraint mapping a position on the user-supplied photographic images to a position on the geometry. For example, as shown in FIG. 1A, FIG. 1B, and FIG. 3, the camera parameters such as the location and direction determined from the estimated location of building 102 may be adjusted according to a constraint mapping a position on the user-supplied photograph, such as photographic image 316, to a position on the geometry of three-dimensional model 302.

At step 412, the user-supplied photographic image may be texture mapped to the geometry. For example, as shown in FIG. 1A, FIG. 1B, and FIG. 3, the user-supplied photographic image, such as photographic image 316, may be texture mapped to the geometry of three-dimensional model 302.

System

Figure 5:
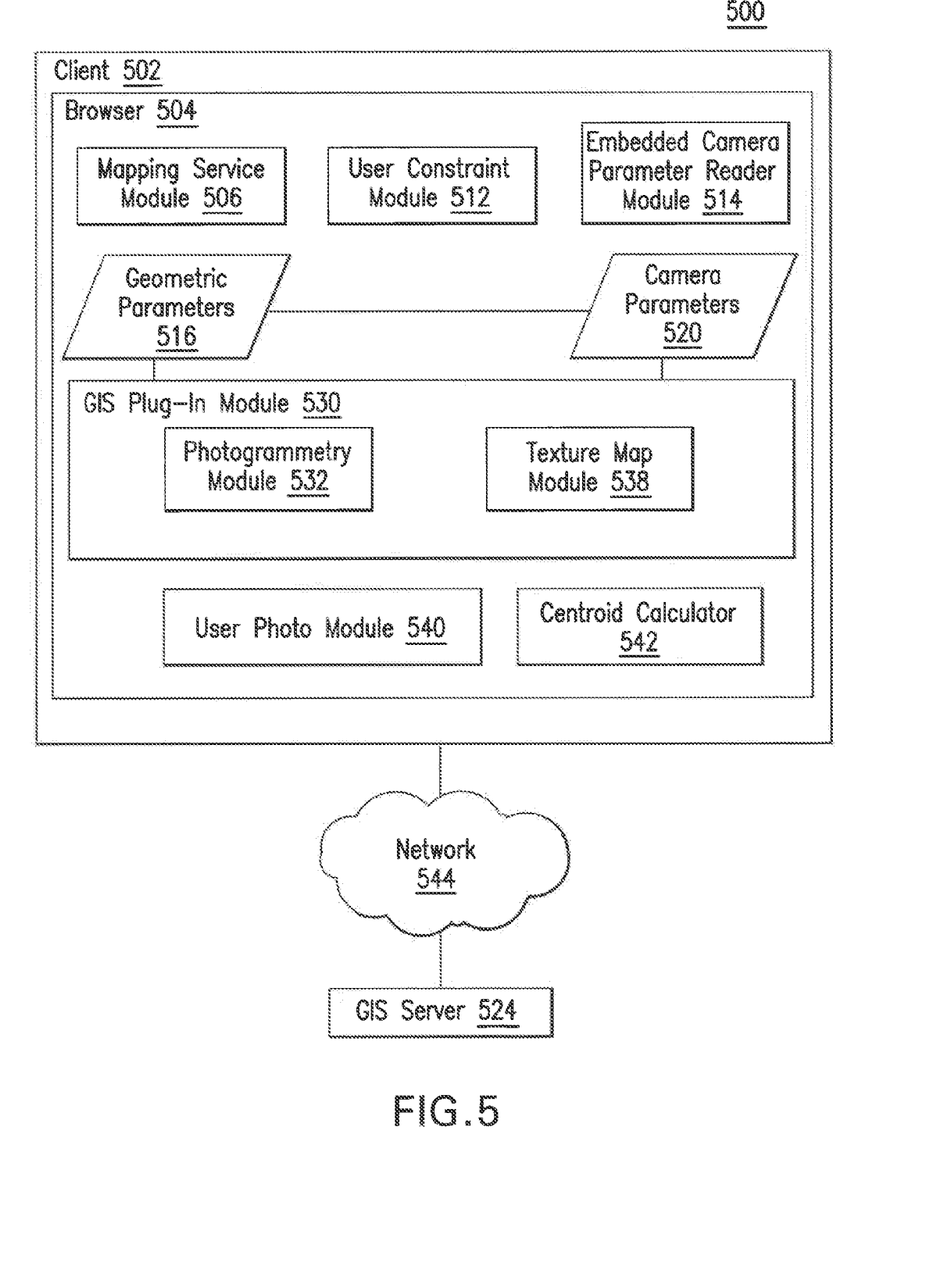
FIG. 5 is a diagram showing a system for creating a three-dimensional model from two-dimensional images, according to an embodiment.

FIG. 5 is a diagram showing a system 500 for creating a three-dimensional model from two-dimensional images. System 500 may operate as described above with respect to FIGS. 1-4. System 500 includes a client 502 coupled to a GIS server 524 via one or more networks 544, such as the Internet. Client 502 includes a browser 504. Browser 504 includes a mapping service module 506, a user constraint module 512, an embedded camera parameter reader module 514, a GIS plug-in module 530, a user photo module 540, centroid calculator 542, geometric parameters 516 and camera parameters 520. GIS plug-in module 530 includes a photogrammetry module 532, a texture map module 538. Each of these components is described below.

In embodiments, browser 504 may be a CHROME, FIREFOX, SAFARI, or INTERNET EXPLORER browser. The components of browser 504 may be downloaded from a server, such as a web server, and run with browser 504. For example, the components of browser 504 may be Hypertext Markup Language (HTML), JavaScript, or a plug-in, perhaps running native code. As mentioned above, mapping service module 506 is one such component. Mapping service module 506 displays a visual representation of a map, for example, as a viewport into a grid of map tiles. Mapping service module 506 is implemented using a combination of markup and scripting elements, for example, using HTML and JavaScript. A user may select the map to indicate where she would like to create a three-dimensional model.

Upon receipt of a user selection indicating a particular region at which to create a three-dimensional model, user constraint module 512 may display an interface as illustrated in examples in FIGS. 2 and 5. As illustrated in those figures, the interface may display photographic images of the area. User constraint module 512 may retrieve the images from GIS server 524.

GIS server 524 may include a web server. A web server is a software component that responds to a hypertext transfer protocol (HTTP) request with an HTTP reply. The web server may serve content such as hypertext markup language (HTML), extendable markup language (XML), documents, videos, images, multimedia features, or any combination thereof. This example is strictly illustrative and does not limit the present invention.

User constraint module 512 may receive at least one constraint, input by a user, for a two-dimensional photographic images from the set of two-dimensional photographic images received from GIS server 524. Each constraint indicates that a position on the two-dimensional photographic image corresponds to a position on the three-dimensional model.

System 500 further includes a user photo module 540 that enables a user to input user photos to be used in modeling and texturing. In an embodiment, each user photo captures a different point-of-view of a geographic structure that is to be modeled so that each point-of-view of the geographic structure is captured. In an embodiment, when the number of constraints received by the user constraint module exceeds a threshold value (e.g. 7), user photo module 540 enables a user to input user photos.

System 500 also includes embedded camera parameter reader module 514 that reads the embedded camera parameters from each user photo inputted by the user. In an embodiment, embedded camera parameter reader module 514 reads embedded camera parameters that specify a position of each camera when each user photo inputted by the user was taken. For example, embedded camera parameter reader module 514 reads the latitudinal and longitudinal positions of each camera when each user photo inputted by the user was taken.

System 500 also includes centroid calculator 542 that calculates the centroid based on the embedded camera parameters from each user photo inputted by the user. In an embodiment, the centroid calculated by centroid calculator 542 may be an estimated centroid of the geographic structure that is to be modeled. Because each point-of-view of the geographic structure is captured by each user photo inputted by the user, the centroid calculated from the embedded camera parameters for each user photo inputted by the user may be an estimated centroid of the geographic structure that is to be modeled. For example, centroid calculator 542 calculates the centroid from the latitudinal and longitudinal positions of each camera that captured each user photo inputted by the user.

Embedded camera parameter reader module 514 automatically determines an estimated location of the geographic structure that is to be modeled based on the embedded camera parameters. In an embodiment, embedded camera parameter reader module 514 determines an estimated location of the geographic structure to be modeled based on the centroid calculated from the embedded camera parameters for each user photo inputted by the user.

Each of client 502 and GIS server 524 may be implemented on any computing device. Such computing device can include, but is not limited to, a personal computer, mobile device such as a mobile phone, workstation, embedded system, game console, television, set-top box, or any other computing device. Further, a computing device can include, but is not limited to, a device having a processor and memory for executing and storing instructions. Software may include one or more applications and an operating system. Hardware can include, but is not limited to, a processor, memory and graphical user interface display. The computing device may also have multiple processors and multiple shared or separate memory components. For example, the computing device may be a clustered computing environment or server farm.

Each of browser 504, mapping service module 506, user constraint module 512, GIS plug-in module 530, photogrammetry module 532, texture map module 538, user photo module 540, centroid calculator 542, and embedded camera parameter reader module 514 may be implemented in hardware, software, firmware, or any combination thereof.

Each of geometric parameters 516 and camera parameters 520 may be stored in any type of structured memory, including a persistent memory. In examples, each database may be implemented as a relational database.

The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for positioning geographic structures, comprising:
   (a) receiving, by one or more computing devices, a plurality of user-supplied photographic images, inputted by a user, wherein each user-supplied photographic image captures a different point-of-view of the geographic structure;
   (b) reading, by the one or more computing devices, from each user-supplied photographic image a plurality of embedded camera parameters that is embedded in each user-supplied photographic image, wherein the plurality of embedded camera parameters for each user-supplied photographic image specifies a geographic location at which the user-supplied photographic image was taken;
   (c) calculating, by the one or more computing devices, an estimated centroid of the geographic structure based on the geographic locations specified by the embedded camera parameters from the plurality of user-supplied photographic images, the estimated centroid corresponding to a centroid of the geographic locations at which the plurality of user-supplied photographic images were taken;
   (d) automatically determining, by the one or more computing devices, an estimated location of the geographic structure based on the estimated centroid of the geographic structure; and
   (e) adjusting, by the one or more computing devices, the plurality of camera parameters for each user-supplied photographic image according to a user-inputted constraint mapping a position on each user-supplied photographic image to a position on a geometry.

2. The method of claim 1, further comprising:
   (f) providing the plurality of user-supplied photographic images for texture mapping onto a three-dimensional model.

3. The method of claim 1, wherein the adjusting (e) comprises using a photogrammetry algorithm to adjust the plurality of camera parameters for each user-supplied photographic image according to the constraint mapping the position on each user-supplied photographic image to the position on the geometry.

4. The method of claim 1, wherein further comprising:
   (f) texture mapping each user-supplied photographic image to the geometry.

5. The method of claim 1, wherein the plurality of embedded camera parameters includes a latitude and a longitude at which each user-supplied photographic image was taken.

6. The method of claim 1, wherein the plurality of camera parameters includes a heading of a camera that took each user-supplied photographic image.

7. The method of claim 1, wherein the plurality of embedded camera parameters is embedded in metadata of each user-supplied photographic image.

8. The method of claim 1, wherein the plurality of user-supplied photographic images includes a quantity of user-supplied photographic images that is sufficient to capture the geographic location from all points-of-view.

9. A system for positioning geographic structures, comprising:
one or more computing devices, the one or more computing devices including at least one processor and associated memory, the memory storing instructions that, when implemented by the at least one processor, configure the one or more computing devices to:
(a) receive a plurality of user-supplied photographic images, inputted by a user, wherein each user-supplied photographic image captures a different point-of-view of the geographic structure;
(b) read from each user-supplied photographic image a plurality of embedded camera parameters that is embedded in each user-supplied photographic image, wherein the plurality of embedded camera parameters for each user-supplied photographic image specifies a geographic location at which the user-supplied photographic image was taken;
(c) calculate an estimated centroid of the geographic structure based on the geographic locations specified by the embedded camera parameters from the plurality of user-supplied photographic images, the estimated centroid corresponding to a centroid of the geographic locations at which the plurality of user-supplied photographic images were taken;
(d) automatically determine an estimated location of the geographic structure based on the estimated centroid of the geographic structure; and
(e) adjust the plurality of camera parameters for each user-supplied photographic image according to a user-inputted constraint mapping a position on each user-supplied photographic image to a position on a geometry.

10. The system of claim 9, wherein the one or more computing devices are further configured to texture map the plurality of user-supplied photographic images to a three-dimensional model.

11. The system of claim 9, wherein the one or more computing devices are configured to use a photogrammetry algorithm to adjust the plurality of camera parameters for each user-supplied photographic image according to the constraint mapping the position on each user-supplied photographic image to the position on the geometry.

12. The system of claim 9, wherein the one or more computing devices are further configured to map the user-supplied photographic image to the geometry.

13. The system of claim 9, wherein the plurality of embedded camera parameters includes a latitude and a longitude at which each user-supplied photographic image was taken.

14. The system of claim 9, wherein the plurality of camera parameters includes a heading of a camera that took each user-supplied photographic image.

15. The system of claim 9, wherein the plurality of embedded camera parameters is embedded in metadata of each user-supplied photographic image.

16. The system of claim 9, wherein the plurality of user-supplied photographic images includes a quantity of user-supplied photographic images that is sufficient to capture the geographic location from all points-of-view.

17. One or more non-transitory computer-readable media storing computer-readable instructions that when executed by one or more processors cause the one or more processors to perform operations, the operations comprising:
receiving a plurality of user-supplied photographic images, inputted by a user, wherein each user-supplied photographic image captures a different point-of-view of a geographic structure;
reading from each user-supplied photographic image a plurality of embedded camera parameters that is embedded in each user-supplied photographic image, wherein the plurality of embedded camera parameters for each user-supplied photographic image specifies a geographic location at which the user-supplied photographic image was taken;
calculating an estimated centroid of the geographic structure based on the geographic locations specified by the embedded camera parameters from the plurality of user-supplied photographic images, the estimated centroid corresponding to a centroid of the geographic locations at which the plurality of user-supplied photographic images were taken;
automatically determining an estimated location of the geographic structure based on the estimated centroid of the geographic structure; and
adjusting the plurality of camera parameters for each user-supplied photographic image according to a user-inputted constraint mapping a position on each user-supplied photographic image to a position on a geometry.

18. The one or more non-transitory computer-readable media of claim 17, further comprising:
providing the plurality of user-supplied photographic images for texture mapping onto a three-dimensional model.

19. The one or more non-transitory computer-readable media of claim 17, wherein the adjusting comprises using a photogrammetry algorithm to adjust the plurality of camera parameters for each user-supplied photographic image according to the constraint mapping the position on each user-supplied photographic image to the position on the geometry.

20. The one or more non-transitory computer-readable media of claim 17, further comprising:
texture mapping each user-supplied photographic image to the geometry.

21. The one or more non-transitory computer-readable media of claim 17, wherein the plurality of embedded camera parameters includes a latitude and a longitude at which each user-supplied photographic image was taken.

22. The one or more non-transitory computer-readable media of claim 17, wherein the plurality of camera parameters includes a heading of a camera that took each user-supplied photographic image.

* * * * *